US009985443B2

United States Patent
Walley et al.

(10) Patent No.: US 9,985,443 B2
(45) Date of Patent: May 29, 2018

(54) MULTI-MODE POWER RECEIVING UNIT AND METHODS FOR USE THEREWITH

(71) Applicant: BROADCOM CORPORATION, Irvine, CA (US)

(72) Inventors: John Stuart Walley, Ladera Ranch, CA (US); David Lee Recker, San Jose, CA (US)

(73) Assignee: AVAGO TECHNOLOGIES GENERAL IP (SINGAPORE) PTE. LTD, Singapore (SG)

( * ) Notice: Subject to any disclaimer, the term of this patent is extended or adjusted under 35 U.S.C. 154(b) by 381 days.

(21) Appl. No.: 14/965,400

(22) Filed: Dec. 10, 2015

(65) Prior Publication Data
US 2017/0141585 A1   May 18, 2017

Related U.S. Application Data

(60) Provisional application No. 62/256,933, filed on Nov. 18, 2015.

(51) Int. Cl.
| | |
|---|---|
| H01F 38/00 | (2006.01) |
| H02J 5/00 | (2016.01) |
| H02J 50/10 | (2016.01) |
| H02J 7/02 | (2016.01) |
| H02M 3/335 | (2006.01) |
| H02J 50/12 | (2016.01) |

(52) U.S. Cl.
CPC .............. *H02J 5/005* (2013.01); *H02J 7/025* (2013.01); *H02J 50/10* (2016.02); *H02J 50/12* (2016.02); *H02M 3/335* (2013.01)

(58) Field of Classification Search
USPC ......................................................... 307/104
See application file for complete search history.

(56) References Cited

U.S. PATENT DOCUMENTS

2013/0043734 A1* 2/2013 Stone ................... H04B 5/0037
307/104

* cited by examiner

*Primary Examiner* — Rexford Barnie
*Assistant Examiner* — Dru Parries
(74) *Attorney, Agent, or Firm* — Garlick & Markison; Bruce E. Stuckman

(57) ABSTRACT

Aspects of the subject disclosure may include, for example, a power receiving unit that includes a first wireless power receiver configured to receive a first wireless power signal in accordance with a first wireless power standard and a second wireless power receiver configured to receive a second wireless power signal in accordance with a second wireless power standard. A controllable rectifier circuit is configured to rectify either the first wireless power signal or the second wireless power signal. The controllable rectifier circuit includes a rectifier circuit configured to generate a rectified voltage from the wireless power signal, based on switch control signals. A rectifier control circuit is configured to determine whether the first wireless power signal or the second wireless power signal is received and to generate the switch control signals, based on whether the first wireless power signal or the second wireless power signal is received.

13 Claims, 8 Drawing Sheets

US 9,985,443 B2

MULTI-MODE POWER RECEIVING UNIT AND METHODS FOR USE THEREWITH

CROSS-REFERENCE TO RELATED APPLICATIONS

The present U.S. Utility Patent Application claims priority under 35 U.S.C. 119(e) to U.S. Provisional Application No. 62/256,933, entitled, "MULTI-MODE POWER RECEIVING UNIT AND METHODS FOR USE THEREWITH," filed on Nov. 18, 2015, which is hereby incorporated herein by reference in its entirety and made part of the present U.S. Utility Patent Application for all purposes.

BACKGROUND TECHNICAL FIELD

Various embodiments relate generally to wireless communication systems and also to wireless charging of devices.

DESCRIPTION OF RELATED ART

Communication systems are known to support wireless and wireline communications between wireless and/or wireline communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, Bluetooth Low Energy (BLE), advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

The Alliance for Wireless Power (A4WP) has promulgated a baseline systems specification for interoperability of loosely coupled wireless power transfer for portable, hand-held electronic devices. This specification supports a 6.78 MHz for power transfers and a 2.4 GHz operating frequency for management data transfers. The Wireless Power Consortium (WPC) has also promulgated standards used for wireless charging of mobile devices, notably the Qi low power specification.

DETAILED DESCRIPTION

Figure 1:
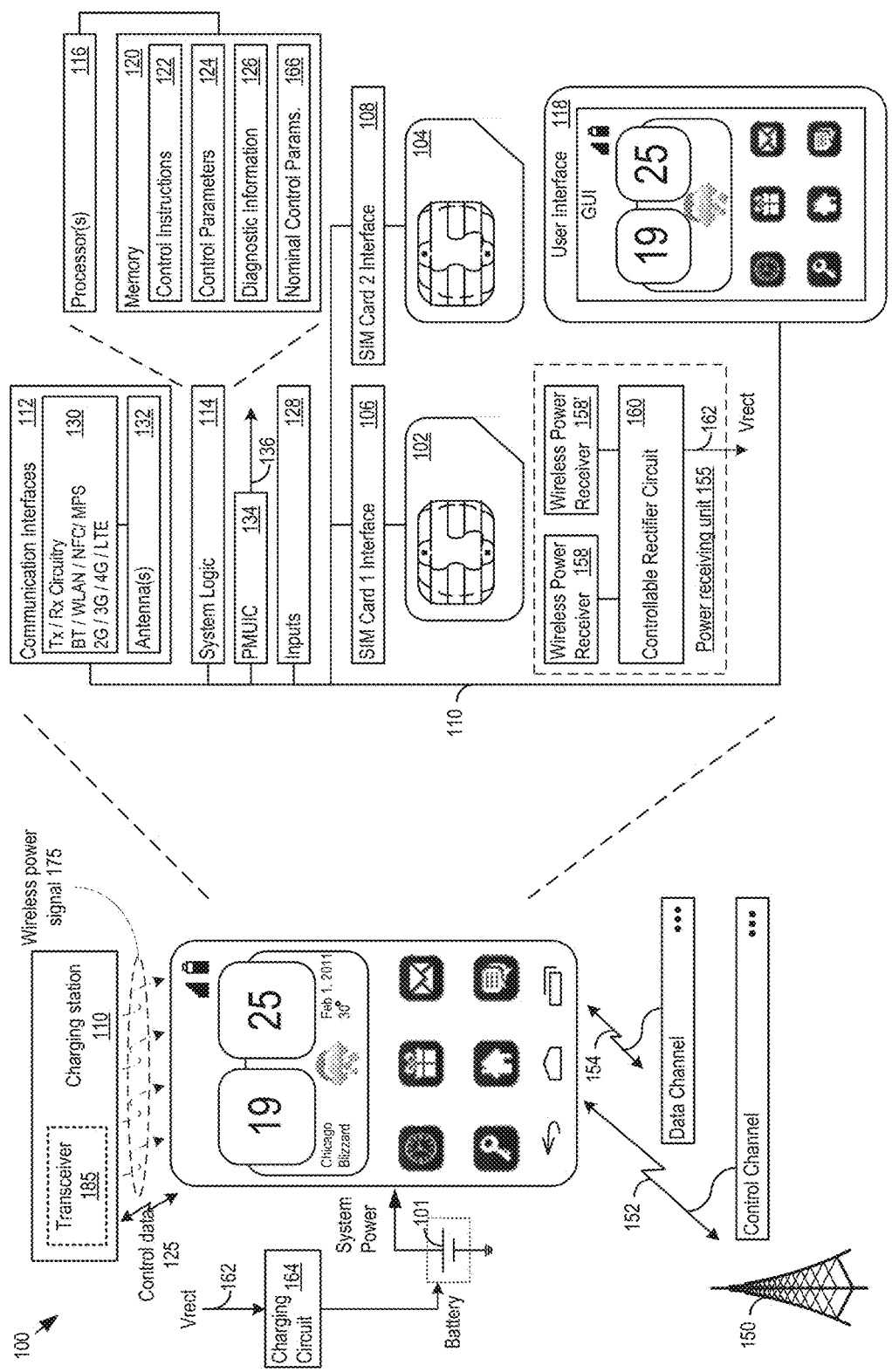
FIG. 1 is a schematic block diagram of an embodiment of a wireless communication device.

FIG. 1 is a schematic block diagram of an embodiment of a wireless communication device. A wireless communication device 100 is shown such as a 2G, 3G, or 4G/LTE smartphone capable of making and receiving wireless phone calls, and transmitting and receiving data using 802.11a/b/g/n/ac/ad ("WiFi" of "WLAN"), Bluetooth (BT), Near Field Communications (NFC), mobile payment system (MPS) data such as LoopPay and/or any other type of wireless technology. In addition to making and receiving phone calls and transceiving data, the wireless communication device 100 optionally runs any number or type of applications. The wireless communication device 100 may draw energy from numerous different sources. As one example, the wireless communication device 100 may draw energy from the battery 101. Other sources of energy include Wireless Power Transfer (WPT) energy sources such as power transmitting unit 156. In that respect, described further below are techniques for harvesting power from wireless signals.

The wireless communication device 100 is shown as a smartphone in this example, but the functions and features described herein can likewise be implemented in other host devices such as a laptop, tablet, cellphone, a peripheral host device such as a keyboard, a mouse, a printer, a microphone, headset, headphones, speakers or other peripheral, a driver assistance module in a vehicle or other vehicle based device, an emergency transponder, a pager, a watch including a smart watch, a satellite television receiver, a stereo receiver, music player, home appliance and/or any electronic host device that is compatible with wireless charging or other wireless power transfer.

In the embodiment shown, the wireless communication device 100 communicates with a network controller 150, such as an enhanced Node B (eNB) or other base station. The network controller 150 and wireless communication device 100 establish communication channels such as the control channel 152 and the data channel 154, and exchange data. The wireless communication device 100 may be exposed to many other sources of wireless signals as well, e.g., from a power transmitting unit 156 or other power transmitting units (PTU), and wireless signals may be harvested in conjunction with the WPT techniques described herein.

In the embodiment shown, the wireless communication device 100 supports one or more Subscriber Identity Modules (SIMs), such as the SIM1 102 and the SIM2 104. Electrical and physical interfaces 106 and 108 connect SIM1 102 and SIM2 104 to the rest of the user equipment hardware, for example, through the system bus 110.

The wireless communication device 100 includes communication interfaces 112, system logic 114, and a user interface 118. The system logic 114 may include any combination of hardware, software, firmware, or other logic. The system logic 114 may be implemented, for example, with one or more systems on a chip (SoC), application specific integrated circuits (ASIC), one or more processors, discrete analog and digital circuits, and other circuitry. The system logic 114 is part of the implementation of any desired functionality in the wireless communication device 100.

The system logic 114 may further facilitate, as examples, decoding and playing music and video, e.g., MP3, MP4, MPEG, AVI, FLAC, AC3, or WAV decoding and playback; running applications; making mobile payments, accepting user inputs; saving and retrieving application data; establishing, maintaining, and terminating cellular phone calls or data connections for, as one example, Internet connectivity;

establishing, maintaining, and terminating wireless network connections, Bluetooth connections, or other connections; and displaying relevant information on the user interface 118. The user interface 118 and the inputs 128 may include a graphical user interface (GUI), touch sensitive display, voice or facial recognition inputs, buttons, switches, speakers and other user interface elements. Additional examples of the inputs 128 include microphones, video and still image cameras, temperature sensors, vibration sensors, rotation and orientation sensors, headset and microphone input/output jacks, Universal Serial Bus (USB) connectors, memory card slots, radiation sensors (e.g., IR sensors and/or other sensors), and other types of inputs.

The system logic 114 may include one or more processors 116 and memories 120. The memory 120 stores, for example, control instructions 122 that the processor 116 executes to carry out desired functionality for the wireless communication device 100. The control parameters 124 provide and specify configuration and operating options for the control instructions 122. The memory 120 may also store diagnostic information 126 and further any BT, WiFi, 3G, MPS or other data that the wireless communication device 100 will send, or has received, through the communication interfaces 112. The wireless communication device 100 may include a power management unit integrated circuit (PMUIC) 134. In a complex device like a smartphone, the PMUIC 134 may be responsible for generating, e.g., thirty (30) different power supply rails 136 for the circuitry in the wireless communication device 100.

In the communication interfaces 112, Radio Frequency (RF) transmit (Tx) and receive (Rx) circuitry 130 handles transmission and reception of BT, WLAN, NFS and/or MPS signals through one or more antennas 132. The communication interface 112 may include one or more transceivers. The transceivers may be wireless transceivers that include modulation/demodulation circuitry, digital to analog converters (DACs), shaping tables, analog to digital converters (ADCs), filters, waveform shapers, filters, pre-amplifiers, power amplifiers and/or other logic for transmitting and receiving through one or more antennas, or (for some devices) through a physical (e.g., wireline) medium.

As just one of many possible implementation examples, the wireless communication device 100 may include (e.g., for the communication interface 112, system logic 114, and other circuitry) a BCM59351 charging circuit, BCM2091 EDGE/HSPA Multi-Mode, Multi-Band Cellular Transceiver and a BCM59056 advanced power management unit (PMU), controlled by a BCM28150 HSPA+ system-on-a-chip (SoC) baseband smartphone processer or a BCM25331 Athena™ baseband processor. These devices or other similar system solutions may be extended as described below to provide the additional functionality described below. These integrated circuits, as well as other hardware and software implementation options for the wireless communication device 100, are available from Broadcom Corporation of Irvine Calif.

The power transmitting unit 156 or another power transmitting unit may generate a wireless power signal 175. In various embodiments, the power receiving unit 155 is a multi-mode device the includes a plurality of wireless power receivers such as wireless power receivers 158 and 158' that operate to receive wireless power signals in accordance with several different wireless power standards. A controllable rectifier circuit 160 receives the wireless power signal via a wireless power receiver 158 or 158'. The output of the controllable rectifier circuit 160 is the wireless power output signal 162, Vrect, that can be used by charging circuit 164 to charge a battery 101 of the wireless communication device 100 and/or to provide other system power.

In various embodiments, the controllable rectifier circuit 160 includes a rectifier having a switching circuits configured to generate a rectified voltage, Vrect, from the wireless power signal, based on switch control signals that include a switch-on signal and a switch-off signal for each switching circuit. A rectifier control circuit generates the switch control signals that generate a rectifier duty cycle that depends on the current loading conditions. In addition, the system logic 114 may exercise control over controllable rectifier circuit. In particular, one or more processors 116 can execute control instructions 122 to change switching parameters that affect the switch timing and rectifier duty cycle of the controllable rectifier circuit 160. In addition, the memory 120 may also store nominal control parameters 166. The nominal control parameters 166 may set or alter switching timing for the controllable rectifier circuit 160 for pre-defined operating scenarios of the wireless communication device 100. For example, the switch timing and rectifier duty cycle may vary based on changes in load and can differ in scenarios such as during startup of the wireless communication device 100, during normal operation of the wireless communication device 100, during high power or low power consumption of the wireless communication device 100 (or any other power consumption mode as determined by comparison of current power consumption against one or more power thresholds), or during any other pre-defined operating scenarios. In some implementations, the nominal control parameters 166 may be stored in a One Time Programmable (OTP) memory, with the nominal control parameters 166 determined, e.g., during a factory calibration process.

The power receiving unit 155 and power transmitting unit 156 optionally exchange control data 125 in order to cooperatively establish a charging session, and further to improve power transfer and efficiency. In the embodiment shown, the power receiving unit 155 wirelessly couples with the transceiver 185 of a PTU such as power transmitting unit 156, via a wireless radio unit included in transmit/receive circuitry 130 or a dedicated wireless radio unit included in power receiving unit 155. The transmit/receive circuitry 130 or a dedicated wireless radio unit operate under control of the system logic 114 or a dedicated processor of PRU 155 to establish the wireless connection, such as a Bluetooth low energy (BLE) connection with the power transmitting unit 156 via a connection establishment procedure and further to exchange control data 125 with the power transmitting unit 156 via the wireless connection. While described above in conjunction with a BLE wireless control channel between the power transmitting unit 156 and PRU 155, other wireless control channels using other wireless standards and/or load modulation of the wireless power signal 175 can likewise be employed.

As previously described, the power receiving unit 155 is a multi-mode device the includes a plurality of wireless power receivers such as wireless power receivers 158 and 158' that operate to receive wireless power signals in accordance with several different wireless power standards. In one mode of operation, power transmitting unit 156 and PRU 155 operate in accordance with a loosely coupled wireless power transfer specification such as the A4WP baseline system specification 1.0 (BSS 1.0). In this mode of operation, the wireless power signal 175 is a 6.78 MHZ signal is sent from the power transmitting unit 156 and PRU 155 via wireless power receiver 158 to transfer energy to charge the wireless communication device in conjunction with a charging session. Control data 125 is exchanged between the power transmitting unit 156 and PRU 155 via a 2.4 GHz Bluetooth LE compatible link to control the power transfer from the power transmitting unit 156 to the PRU 155.

In two other modes of operation, the wireless power receiver 158' receives wireless power signals in accordance with either the Wireless Power Consortium (WPC) Qi low power specification or a Power Matters Alliance (PMA) standard. While two wireless power receivers 158 and 158' have been described in terms of tri-mode operation in accordance with A4WP, WPC and PMA, other wireless power transfer standards can likewise be employed in addition or in the alternative and three or more wireless power receivers can be likewise be included. Further while the wireless power receivers 158 and 158' are shown as separate devices, the wireless power receivers 158 and 158' can optionally share one or more components.

Further embodiments describing the operation of the power transmitting unit 156 and the power receiving unit 155, including numerous optional functions and features, are presented in conjunction with FIGS. 2-5 that follow.

Figure 2:
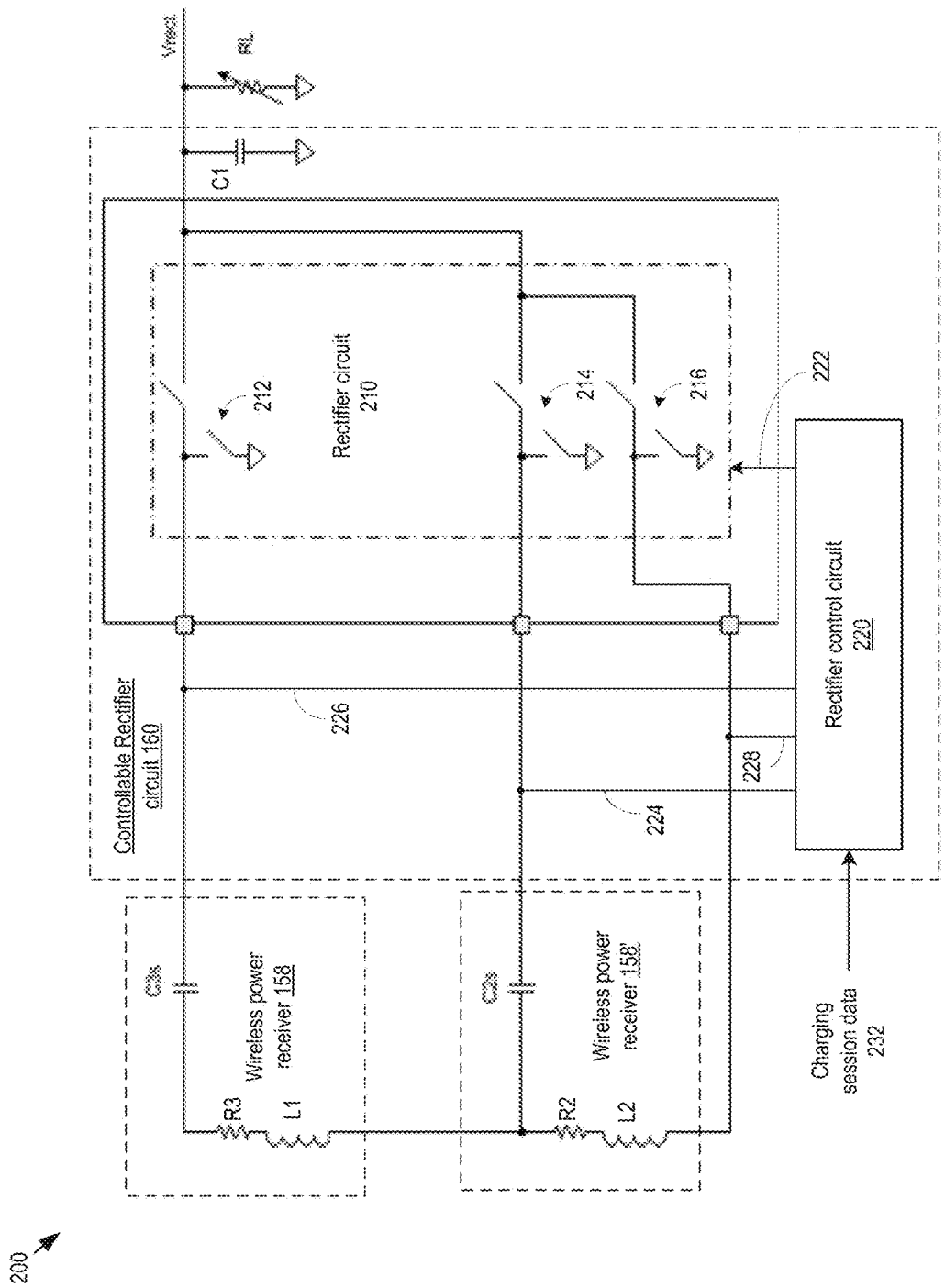
FIG. 2 is a schematic block diagram of an embodiment of components of a power receiving unit.

FIG. 2 is a schematic block diagram 200 of an embodiment of components of a power receiving unit. As just one example, the wireless power receiver 158 includes a tank circuit that includes a coil L1 and a capacitor C3s that is tuned to harvest a 6.78 MHz Alliance for Wireless Power (A4WP) power transmissions. The wireless power receiver 158' includes a tank circuit that includes a coil L2 and a capacitor C2s that is tuned to harvest 80-300 kHz signals for PMA or WPA power transmissions. The coils L1 and L2 are each shown with a series resistor that represents the resistance of each coil, however, an external series resistance can be employed, for example to de-tune the resonant tank for operation with broader frequency bandwidths.

The controllable rectifier circuit 160 is configured to rectify either a wireless power signal received via wireless power receiver 158 or 158'. In particular, the controllable rectifier circuit includes a rectifier circuit 210 having half-bridge rectifiers 212, 214 and 216 configured to operate based on switch control signals 222 to generate the rectified voltage Vrect from the received wireless power signal. The rectifier control circuit 220 is configured to determine whether the wireless power signal is received via the wireless power receiver 158 or 158', and optionally the kind of wireless power signal that is received (A4WP, WPA, PMA, etc.) in order to generate the switch control signals 222 to operate the particular half-bridges that are required to rectify the received power signal. For example, when a wireless power signal is received via wireless power receiver 158, the rectifier control circuit 220 generates switch control signals 222 to control half-bridge rectifiers 212 and 214 to rectify the received wireless power signal and further to control the half-bridge rectifier 216 to open the circuit on coil L2 to stop current flow in the path of wireless power receiver 158'. When a wireless power signal is received via wireless power receiver 158', the rectifier control circuit 220 generates switch control signals 222 to control half-bridge rectifiers 214 and 216 to rectify the received wireless power signal and further to control the half-bridge rectifier 212 to open the circuit on coil L1 to stop current flow in the path of wireless power receiver 158.

Because a full-wave rectifier traditionally includes two half-bridge rectifiers, the rectifier circuit 210 supports the operation of two wireless power receivers with the equivalent of only 1.5 full-wave rectifiers. The rectifier control circuit 220 generates the switch control signals 222 to operate a first proper subset of the three half-bridge rectifiers (212 and 214) when a wireless power signal is received via wireless power receiver 158 and configured to generate the switch control signals 222 to operate a second proper subset of the three half-bridge rectifiers (214 and 216) when the wireless power signal is received via the wireless power receiver 158'. The half-bridge rectifier 214 is used to rectify the wireless power signal whether it is received from wireless power receiver 158 or 158'. The half-bridge rectifier 212 is only employed when a wireless power signal is received from wireless power receiver 158 and the half-bridge rectifier 216 is only employed when a wireless power signal is received from wireless power receiver 158'.

The rectifier control circuit 220 selects the particular subset of the half-bridge rectifiers to use based on a determination of which wireless power receiver 158 or 158' is receiving the wireless power signal. In various embodiments, the rectifier control circuit 220 determines which wireless power receiver (158 or 158') is receiving a particular wireless power signal based on detected a received energy. In particular, the rectifier control circuit 220 can operate by monitoring the signals at points 224, 226 and/or 228 to determine if an energy threshold is exceeded indicating that a particular wireless power is be received by either the wireless power receiver 158 or 158'. In addition or in the alternative, charging session data 232 received by a wireless radio unit in communication with the power transmitting unit in conjunction with the establishment of a wireless charging session can be used to determine which wireless power receiver should be active, based on an identification of the particular type of session being established. For example, when a BLE wireless charging session is established in conjunction with a A4WP compatible PTU, charging session data 232 indicating the establishment of this session can be used by the rectifier control circuit 220 to indicate that wireless power receiver 158 (for example) may be active and to select half-bridge rectifiers 212 and 214 and select nominal timing parameters conforming with 6.78 MHz operation.

While the rectifier circuit 210 and rectifier control circuit 220 are shown separately, in various implementations, the rectifier circuit 210 and rectifier control circuit 220 are integrated into an integrated circuit chip. The two switching circuits used to implement each of the half-bridge rectifiers 212, 214 and 216 can be Metal Oxide Semiconductor FETs (MOSFETs), for example, or other types of transistors or other types of switches. While not expressly shown, each such switching circuit can include an associated diode such as body diodes associated with FET implementations of these switching circuits. In other implementations, switches without body diodes may be used. For example a FET switching structure including cascode connected transistors may implement the switches of the half-bridge rectifiers 212, 214 and 216.

In addition to selecting the particular subset of half-bridge rectifiers to control, rectifier control circuit 220 also controls the timing of the subset of the half-bridge rectifiers that are selected, based on the type and frequency of the wireless power signal received and, for example, further based on load conditions. In operation, the rectifier control circuit 220 controls the selected subset of the half-bridge rectifiers 212, 214 and/or 216 using switch control signals 222 to generate a wireless power output signal, Vrect, as a full wave rectified version of the wireless power signal that is filtered by capacitor C1 into a substantially constant DC voltage—e.g. a DC voltage with acceptable variations or ripple. The switch control signals 222 include a switch-on signal and a switch-off signal to individually control the ON and OFF states of each of the half-bridge circuits currently in use to provide efficient rectification.

The rectifier control circuit 220 generates the switch control signals 222 with timing that depends on the frequency of the received wireless power signal and with a duty cycle that depends on the current load, represented by RL. The rectifier control circuit 220 can include a processor or other circuitry that operates at high frequencies (above 1 MHz) and uses of high bandwidth/low propagation delay comparators to sense when to turn on and off the power FETs in the H-bridge based on the signal at points 224 and 226 in the case of wireless power signal received via a wireless power receiver 158 and based on the signal at points 224 and 228 in the case of a wireless power signal received via wireless power receiver 158'. Because wireless power systems are typically designed to operate at a fixed (A4WP) or slowly varying (PMA/WPC) frequency, the rectifier control circuit 220 can control the rectifier duty cycle to a nominal value that depends on the load conditions at the time.

In other examples, the system logic 114, a processor or other circuitry may be used to implement the rectifier control circuit 220. In particular, one or more processors 116 can execute control instructions 122 to change switching parameters that affect the switch timing and rectifier duty cycle of the controllable rectifier circuit 220. In addition, the memory 120 may also store nominal control parameters 166. The nominal control parameters 166 may set or alter switching timing for the controllable rectifier circuit 220 for pre-defined operating scenarios of the wireless communication device 100. For example, the switch timing and rectifier duty cycle may vary based on changes in load and can differ in scenarios such as during startup of the wireless communication device 100, during normal operation of the wireless communication device 100, during high power or low power consumption of the wireless communication device 100 (or any other power consumption mode as determined by comparison of current power consumption against one or more power thresholds), or during any other pre-defined operating scenarios. In some implementations, the nominal control parameters 166 may be stored in a One Time Programmable (OTP) memory, with the nominal control parameters 166 determined, e.g., during a factory calibration process. Long term, as load power increases and decreases, delay timing will change resulting in differing value of rectifier duty cycles, but short term (over the span of several carrier clock cycles) the timing remains relatively constant.

Figure 3:
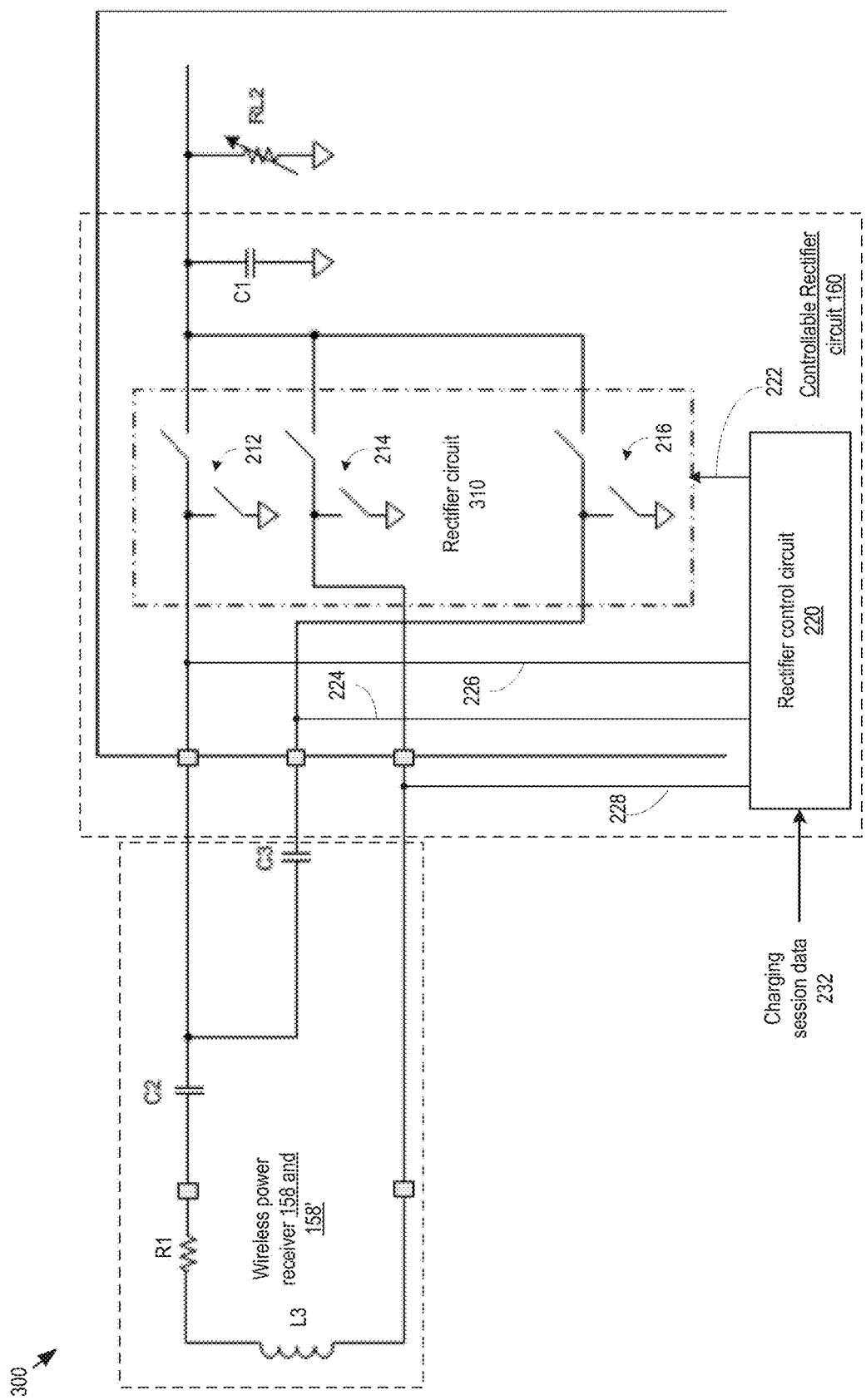
FIG. 3 is a schematic block diagram of an embodiment of components of a power receiving unit.

FIG. 3 is a schematic block diagram 300 of an embodiment of components of a power receiving unit. In particular a power receiving unit is shown that includes many similar elements to the power receiving unit described in conjunction with FIG. 2 that are referred to by common reference numerals. In this embodiment, however, a single receive coil, L3, is shared by two wireless power receivers 158 and 158'. For example, capacitor C2 can be selected in a first tank circuit with inductor L3 that forms a wireless power receiver 158 tuned to resonate at an A4WP frequency. The capacitor C3 can be selected in a second tank circuit with inductor L3 that forms a wireless power receiver 158' tuned to resonate at WPA and/or PMA frequencies. Other wireless standards could likewise be implemented in a similar fashion.

As in the two coil power receiving unit of FIG. 2, the controllable rectifier circuit 160 is configured to rectify either a wireless power signal received via wireless power receiver 158 (L3, C2) or 158' (L3, C3). In particular, the controllable rectifier circuit includes a rectifier circuit 310 having half-bridge rectifiers 212, 214 and 216 configured to operate based on switch control signals 222 to generate the rectified voltage Vrect from the received wireless power signal. The rectifier control circuit 220 is configured to determine whether the wireless power signal is received via the wireless power receiver 158 or 158', and optionally the kind of wireless power signal that is received (A4WP, WPA, PMA, etc.) in order to generate the switch control signals 222 to operate the particular half-bridges that are required to rectify the received power signal. For example, when a wireless power signal is received via wireless power receiver 158 (L3, C2), the rectifier control circuit 220 generates switch control signals 222 to control half-bridge rectifiers 212 and 214 to rectify the received wireless power signal. When a wireless power signal is received via wireless power receiver 158' (L3, C3), the rectifier control circuit 220 generates switch control signals 222 to control half-bridge rectifiers 214 and 216 to rectify the received wireless power signal.

Figure 4:
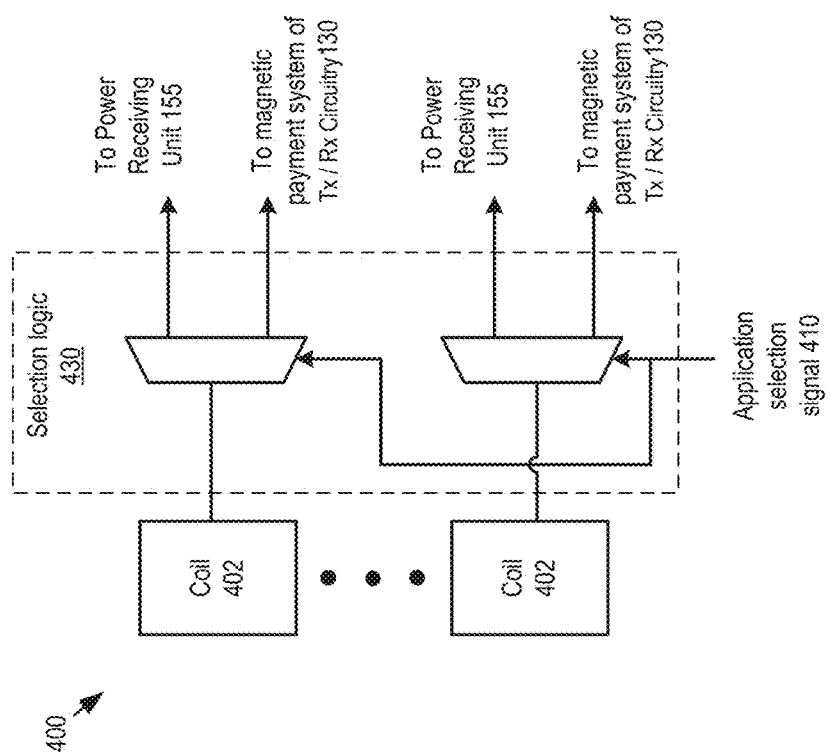
FIG. 4 is a schematic block diagram of an embodiment of a plurality of shared coils.

FIG. 4 is a schematic block diagram 400 of an embodiment of a plurality of shared coils. As discussed in conjunction with FIG. 1, a wireless communication device may include Tx/Rx circuitry 130 with mobile payment system (MPS) functionality. When the MPS functionality operates via a magnetic mobile payment system such as a LoopPay system that interfaces with magnetic strip card readers, the antennas 132 associated with the MPS can be implemented via coils one or more coils 402 that could likewise be suitable for wireless power transfer. While particular selection logic 430 is presented other switching networks, and other circuits could likewise be employed.

In various embodiments the wireless communication device can include selection logic 430 that selectively couples the coils 402 to either wireless power receivers of a power receiving unit 155 or a magnetic MPS of the Tx/Rx circuitry 130. In particular the selection logic can operate via an application selection signal 410 generated by a user in response to interaction with the user interface of the wireless communication device. In other examples, the application selection signal 410 can be generated based on the particular application being run by the wireless communication device. In this fashion, when an MPS application is launched by the wireless communication device in order to initiate a mobile payment, the application selection signal 410 can be generated to couple the coils 402 to the magnetic MPS of the Tx/Rx circuitry 130. When a WPT application is launched by the wireless communication device in order to initiate wireless power transfer, the application selection signal 410 can be generated to couple the coils 402 to the PRU 155.

Figure 5:
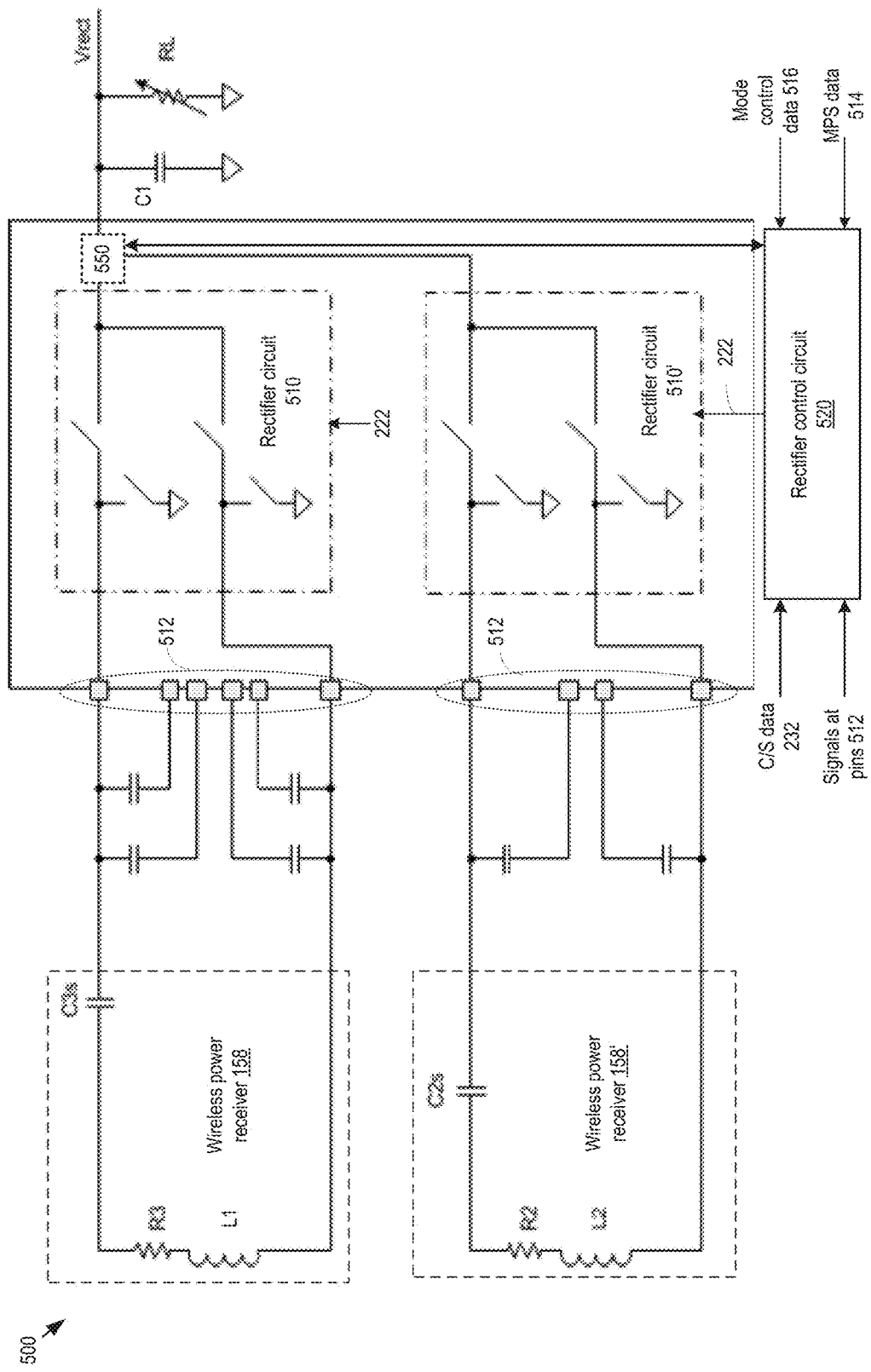
FIG. 5 is a schematic block diagram of an embodiment of components of a power receiving unit.

FIG. 5 is a schematic block diagram of an embodiment of components of a power receiving unit. In particular a power receiving unit is shown that includes many similar elements to the power receiving unit described in conjunction with FIG. 2 that are referred to by common reference numerals. In this example however, the wireless power receivers 158 and 158' are individually supported by two full rectifier circuits 510 and 510' that each operate under control of rectifier control circuit 520.

Like rectifier control circuit 220, the rectifier control circuit 520 determines which wireless power receiver (158 or 158') is receiving a particular wireless power signal based on detecting the received energy. In particular, the rectifier control circuit 520 can operate by monitoring the signals at pins 512 to determine if an energy threshold is exceeded indicating that a particular wireless power is be received by either the wireless power receiver 158 or 158'. In one mode of operation, the rectifier control circuit 520 turns off one or both rectifiers 510 and 510' for a period of time to monitoring the signals at pins 512 to determine which of the wireless power receivers 158 and 158' is receiving the strongest signal and/or whether or both of the either wireless power receivers 158 and 158' is receiving a strong enough signal to support wireless charging.

In addition or in the alternative, charging session (C/S) data 232 received by a wireless radio unit in communication with the power transmitting unit in conjunction with the establishment of a wireless charging session can be used to determine which wireless power receiver should be active, based on an identification of the particular type of session being established. The rectifier control circuit 520 may also generate the switch control signals 222, based on the signals at pins 512, with timing that depends on the frequency of the received wireless power signal and with a duty cycle that depends on the current load, represented by RL. The loop current for the receive loop not being used should be low in this case. While not expressly shown, soft clamping can be included in each of the rectifier circuits 510 and 510' to protect the chip from potentially high voltages.

In addition to supporting the functions and features described in conjunction with FIG. 2, this embodiment supports several additional modes of operation. In various embodiments, the rectifier control circuit 520 responds to mode control data 516 that selectively enables or disables contemporaneous operation of the rectifier circuits 510 and 510'. For example, because separate rectifier circuits 510 and 510' are employed, the wireless power receivers 158 and 158' can operate under control of rectifier control circuit 520 to contemporaneously harvest power from two different wireless power signals. In this fashion, the output voltage Vrect can be generated based on the combination of the outputs of the rectifier circuits 510 and 510'.

The junction 550 includes, for example, a summing circuit or other circuit to combine the current outputs of the rectifier circuits 510 and 510' to generate the rectified voltage Vrect. Such a summing circuit can include one or more resistors, one or more FETs or other transistors or diodes or other circuit components. In addition to including a summing circuit, the junction 550 can optionally operate under control of the rectifier control circuit 520 to disconnect the load and measure the direction of current flow between the rectifier circuits 510 and 510' to determine which of the wireless power receivers 158 and 158' is receiving the strongest signal. This monitoring can take place over several rectifier cycles or other sensing window of time and be used by the rectifier control circuit 520, either alone or in combination with the signals at pins 512 and the charging session data 232 to determine which wireless power receiver 158 or 158' to operate, and/or whether of the either or both of wireless power receivers 158 and 158' is receiving a strong enough signal to support wireless charging.

The rectifier control circuit 520 can also respond to mode control data 516 that selectively switches one or both rectifier circuits 510 and 510' to a transmit mode rather than a receive mode to support, for example, magnetic payment system operation of the coils L1 and L2. When a rectifier circuit 510 is in transmit mode, the rectifier control circuit 520 generates a switch control signals 222 to generate a magnetic signal that is transmitted by the wireless power receiver 158 or 158' from the Vrect voltage. In the MPS example discussed above, MPS data 514 is received by the rectifier control circuit 520 and used to modulate the magnetic signal transmitted by the wireless power receivers 158 and 158'. For example, a LoopPay compatible signal can be generated in this fashion for interfacing with a magnetic strip reader at a point of sale terminal.

The rectifier control circuit 520 can also respond to mode control data 516 that selectively switches one rectifier circuits 510 or 510' to a transmit mode while the other rectifier circuit 510 or 510' operates contemporaneously in a receive mode. In this mode of operation, the function 550 is controlled by the rectifier control circuit 520 allow reverse current flow from one rectifier circuit 510 or 510' supporting operation of a wireless power receiver to the other rectifier circuit supporting the operation as a wireless power transmitter. This allows power harvesting to take place with one rectifier circuit while the other circuit is used to transmit a signal to support near field communications, a magnetic payment system or other transmissions.

Figure 6:
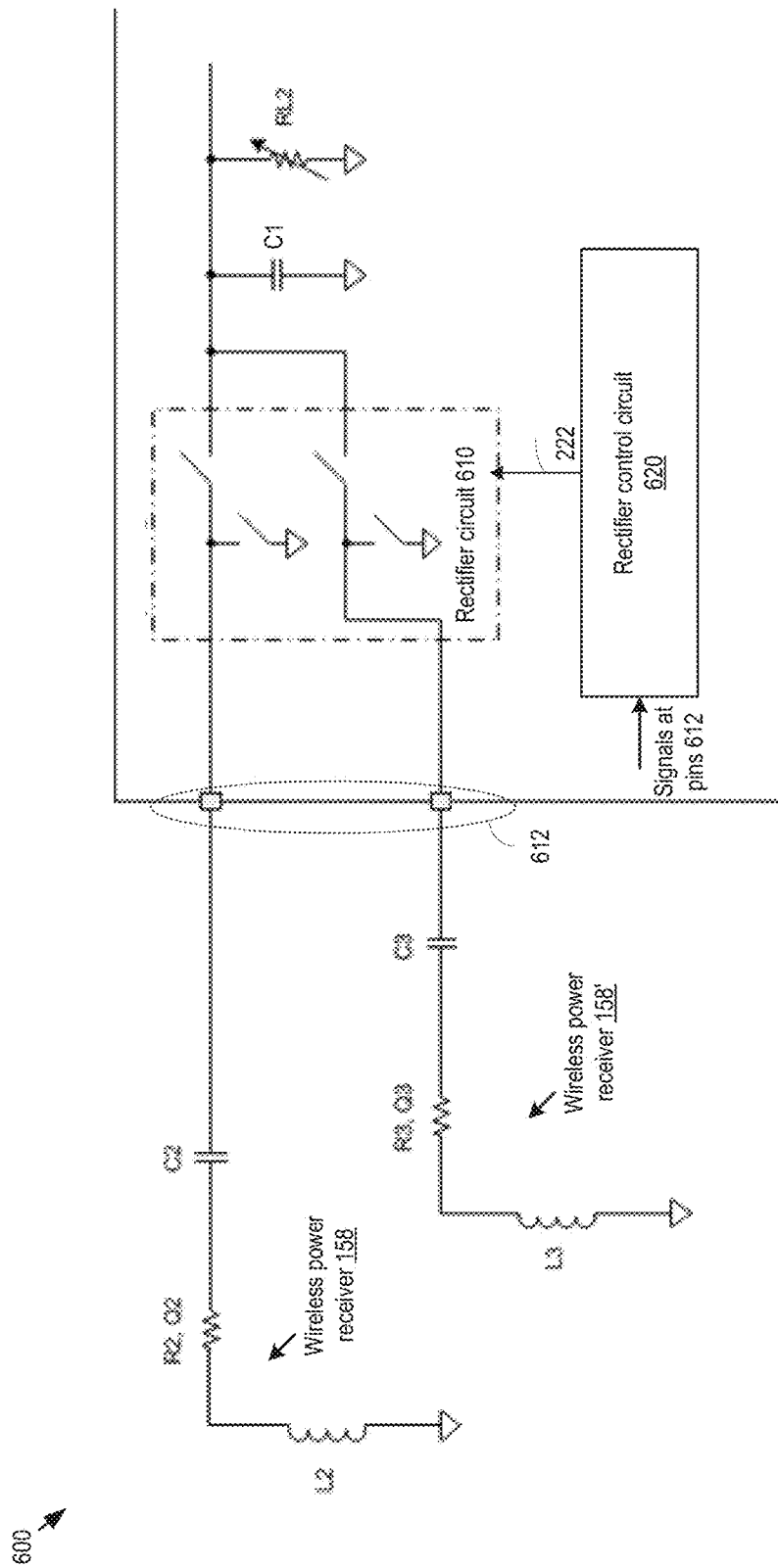
FIG. 6 is a schematic block diagram of an embodiment of components of a power receiving unit.

FIG. 6 is a schematic block diagram of an embodiment of components of a power receiving unit. In particular a power receiving unit is shown that includes many similar elements to the power receiving unit described in conjunction with FIG. 2 that are referred to by common reference numerals. In this example however, the wireless power receivers 158 and 158' are supported by a rectifier circuit 610 having two half-bridge rectifiers. A rectifier control circuit 620 may also generate the switch control signals 222, based on the signals at pins 612. This circuit can operate similarly to the circuit of FIG. 5, in a half-bridge mode with half-bridge rectification instead of full-bridge rectification for the wireless power receiver 158 or 158'.

The rectifier control circuit 620 can also operate in a dual half-bridge mode when different signals are received by the each coil. Further, the rectifier control circuit 620 in a full-bridge mode to operate with both coils as a full bridge circuit when both coils receive the same wireless power signal. The rectifier control circuit 620 can operate to estimate activity on each pin 612 and determine whether a full bridge mode, half-bridge mode or dual half-bridge is appropriate.

Figure 7:
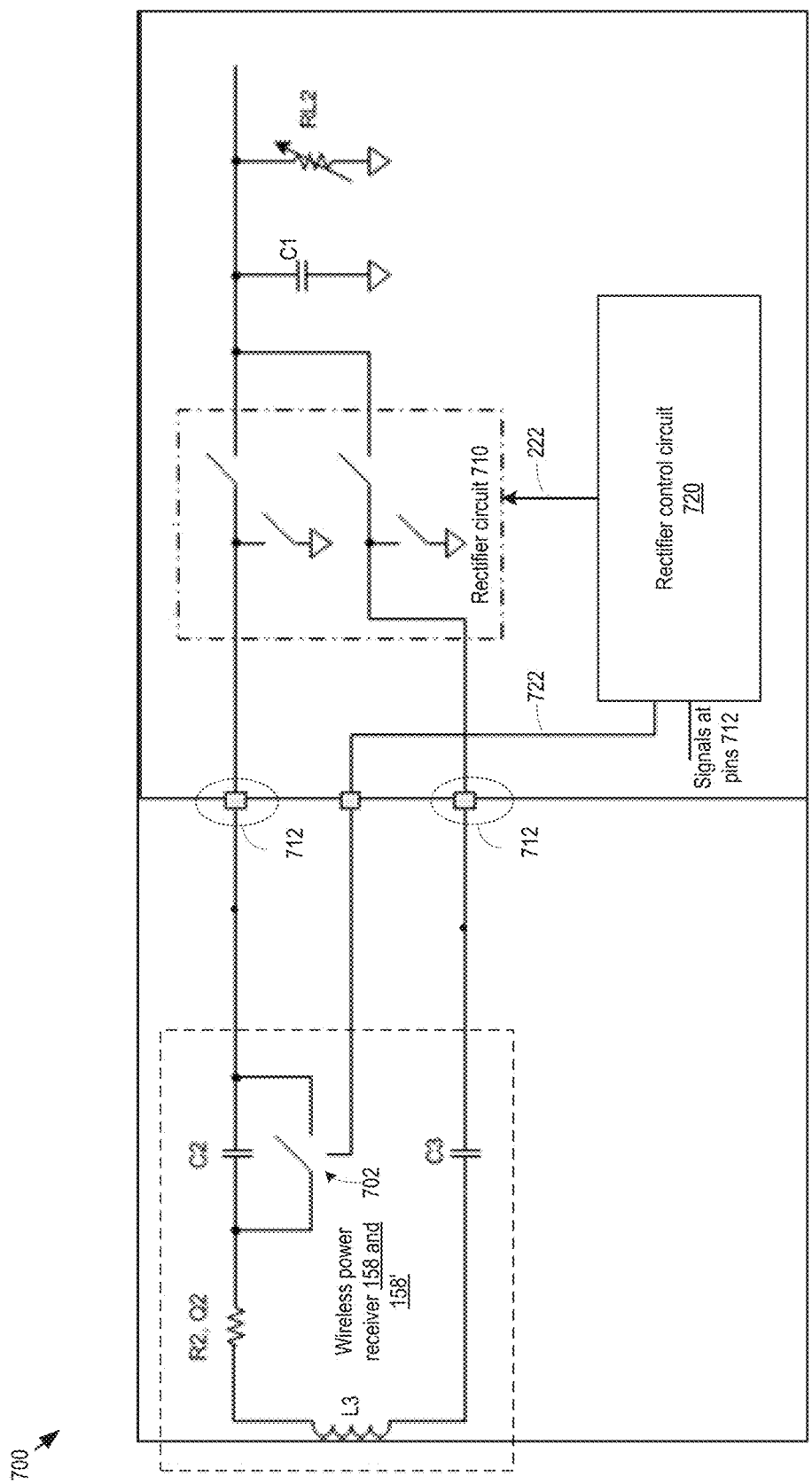
FIG. 7 is a schematic block diagram of an embodiment of components of a power receiving unit.

FIG. 7 is a schematic block diagram of an embodiment of components of a power receiving unit. In particular a power receiving unit is shown that includes many similar elements to the power receiving unit described in conjunction with FIG. 3 that are referred to by common reference numerals. In this example however, wireless power receivers 158 and 158' share a single coil and are supported by a rectifier circuit 710 having two half-bridge rectifiers. A rectifier control circuit 720 may also generate the switch control signals 222, based on the signals at pins 712. The switch 702 selectively shorts the capacitor C2 to change the resonant frequency of the wireless power receiver 158 and 158' for example, for operation in WPC/PMA mode or A4WP mode. The rectifier control circuit 720 can include a very low power detector and charge pump to determine when to change the state of the switch 702 to adjust the matching to the correct value. In an embodiment, rectifier control circuit 720 selectively shorts C2 during detection to determine the type of the wireless power signal that is present.

Figure 8:
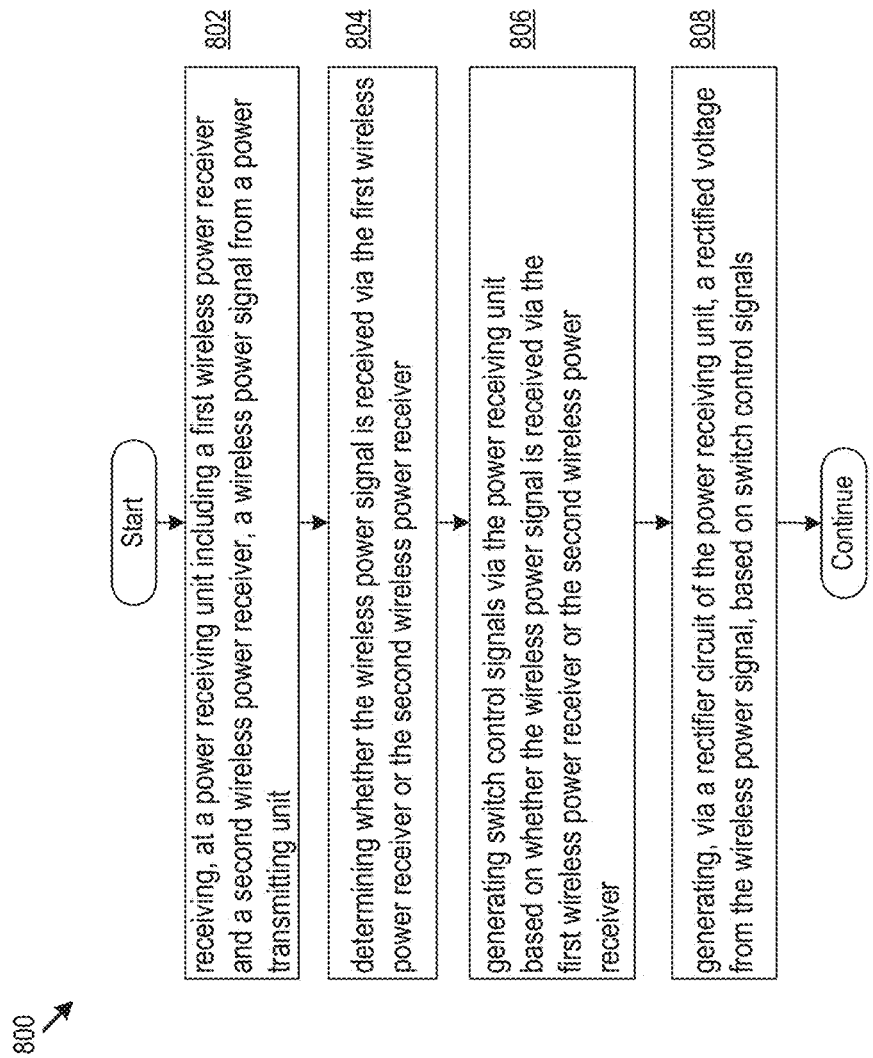
FIG. 8 is a flowchart representation of an embodiment of a method.

FIG. 8 is a flowchart representation 800 of an embodiment of a method. In particular, a method is presented for use with one or more functions and features described in conjunction with FIGS. 1-7. Step 802 includes receiving, at a power receiving unit including a first wireless power receiver and a second wireless power receiver, a wireless power signal from a power transmitting unit. Step 804 includes determining whether the wireless power signal is received via the first wireless power receiver or the second wireless power receiver. Step 806 includes generating switch control signals via the power receiving unit based on whether the wireless power signal is received via the first wireless power receiver or the second wireless power receiver. Step 808 includes generating, via a rectifier circuit of the power receiving unit, a rectified voltage from the wireless power signal, based on switch control signals.

In various embodiments, the switch control signals are generated to configure at least one half-bridge rectifier configured to rectify the wireless power signal when the wireless power signal is received via the first wireless power receiver and further to rectify the wireless power signal when the wireless power signal is received via the second wireless power receiver. The rectifier circuit can includes three half-bridge rectifiers and the switch control signals can be generated to operate a first proper subset of the three half-bridge rectifiers when the wireless power signal is received via the first wireless power receiver and to operate a second proper subset of the three half-bridge rectifiers when the wireless power signal is received via the second wireless power receiver. For example, a single one of the three half-bridge rectifiers can be in both the first proper subset and the second proper subset.

In various embodiments, the determination of whether the wireless power signal is received via the first wireless power receiver or the second wireless power receiver is based on detecting a received energy from one of: the first power receiver or the second power receiver. The determination of whether the wireless power signal is received via the first wireless power receiver or the second wireless power receiver can also be based on data from wireless charging session establishment procedure communicated via a wireless radio unit.

As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may also be used herein, the terms "processing module", "module", "processing circuit", and/or "processing unit" (e.g., including various modules and/or circuitries such as may be operative, implemented, and/or for encoding, for decoding, for baseband processing, etc.) may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory (ROM), random access memory (RAM), volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

Various embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

A physical embodiment of an apparatus, an article of manufacture, a machine, and/or of a process that includes one or more embodiments may include one or more of the aspects, features, concepts, examples, etc. described with herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

The term "module" is used in the description of the various. A module includes a functional block that is implemented via hardware to perform one or module functions such as the processing of one or more input signals to produce one or more output signals. The hardware that implements the module may itself operate in conjunction software, and/or firmware. As used herein, a module may contain one or more sub-modules that themselves are modules.

While particular combinations of various options, methods, functions and features have been expressly described herein, other combinations of these options, methods, functions and features are likewise possible. The various embodiments are not limited by the particular examples disclosed herein and expressly incorporates these other combinations.

What is claimed is:

1. A power receiving unit comprising:
   a first wireless power receiver configured to receive a first wireless power signal in accordance with a first wireless power standard;
   a second wireless power receiver configured to receive a second wireless power signal in accordance with a second wireless power standard;
   a controllable rectifier circuit configured to rectify one of: the first wireless power signal or the second wireless power signal, the controllable rectifier circuit comprising:
      a rectifier circuit configured to generate a rectified voltage from the wireless power signal, based on switch control signals; and
      a rectifier control circuit configured to determine whether the first wireless power signal or the second wireless power signal is received and to generate the switch control signals, based on whether the first wireless power signal or the second wireless power signal is received wherein the rectifier circuit includes three half-bridge rectifiers; wherein the rectifier control circuit is further configured to generate the switch control signals to operate a first proper subset of the three half-bridge rectifiers when the first wireless power signal is received and configured to generate the switch control signals to operate a second proper subset of the three half-bridge rectifiers when the second wireless power signal is received; and wherein a single one of the three half-bridge rectifiers is in both the first proper subset and the second proper subset.

2. The power receiving unit of claim 1 wherein the rectifier control circuit determines whether the first wireless power signal or the second wireless power signal is received based on detecting a received energy from one of: the first power receiver or the second power receiver.

3. The power receiving unit of claim 1 further comprising:
   a wireless radio unit that communicates with a power transmitting unit to establish a wireless charging session;
   wherein the rectifier control circuit determines whether the first wireless power signal or the second wireless power signal is received based on data from wireless charging session.

4. The power receiving unit of claim 1 wherein the first wireless power receiver includes a first coil and the second wireless power receiver includes a second coil.

5. The wireless power receiver of claim 4 wherein the first coil and the second coil are shared with a magnetic mobile payment system; and
   wherein selection logic selectively couples the first coil and the second coil to either the wireless power receiver or the magnetic mobile payment system in response to an application selection signal.

6. The power receiving unit of claim 1 wherein the first wireless power receiver is further configured to receive a third wireless power signal in accordance with a third wireless power standard.

7. A method comprising:
   receiving, at a power receiving unit including a first wireless power receiver and a second wireless power receiver, a wireless power signal from a power transmitting unit;
   determining whether the wireless power signal is received via the first wireless power receiver or the second wireless power receiver;
   generating switch control signals via the power receiving unit based on whether the wireless power signal is received via the first wireless power receiver or the second wireless power receiver; and
   generating, via a rectifier circuit of the power receiving unit, a rectified voltage from the wireless power signal, based on switch control signals wherein the rectifier circuit includes three half-bridge rectifiers; wherein the switch control signals are generated to operate a first proper subset of the three half-bridge rectifiers when the wireless power signal is received via the first wireless power receiver and to operate a second proper subset of the three half-bridge rectifiers when the wireless power signal is received via the second wireless power receiver; and wherein a single one of the three half-bridge rectifiers is in both the first proper subset and the second proper subset.

8. The method of claim 7 wherein determining whether the wireless power signal is received via the first wireless power receiver or the second wireless power receiver is based on detecting a received energy from one of: the first power receiver or the second power receiver.

9. The method of claim 7 wherein determining whether the wireless power signal is received via the first wireless power receiver or the second wireless power receiver is based on data from wireless charging session establishment procedure communicated via a wireless radio unit.

10. A power receiving unit comprising:
    a first wireless power receiver configured to receive a first wireless power signal in accordance with a first wireless power standard;
    a second wireless power receiver configured to receive a second wireless power signal in accordance with a second wireless power standard;
    a controllable rectifier circuit configured to rectify one of: the first wireless power signal or the second wireless power signal, the controllable rectifier circuit comprising:
       a rectifier circuit including three half-bridge rectifiers configured to generate a rectified voltage from the wireless power signal, based on switch control signals; and
       a rectifier control circuit configured to determine whether the first wireless power signal or the second wireless power signal is received and to generate the switch control signals to control operation of a selected two of the three half-bridge rectifiers, based on whether the first wireless power signal or the second wireless power signal is received.

11. The power receiving unit of claim 10 wherein the rectifier control circuit determines whether the first wireless power signal or the second wireless power signal is received based on detecting a received energy from one of: the first power receiver or the second power receiver.

12. The power receiving unit of claim 10 further comprising:
   a wireless radio unit that communicates with a power transmitting unit to establish a wireless charging session;
   wherein the rectifier control circuit determines whether the first wireless power signal or the second wireless power signal is received based on data from wireless charging session.

13. The power receiving unit of claim 10 wherein the first wireless power receiver and the second wireless power receiver share a single coil.

* * * * *